July 21, 1925.

A. ASSORATI

POWER APPARATUS

Filed Nov. 29, 1924

INVENTOR
Antenor Assorati
BY
ATTORNEYS

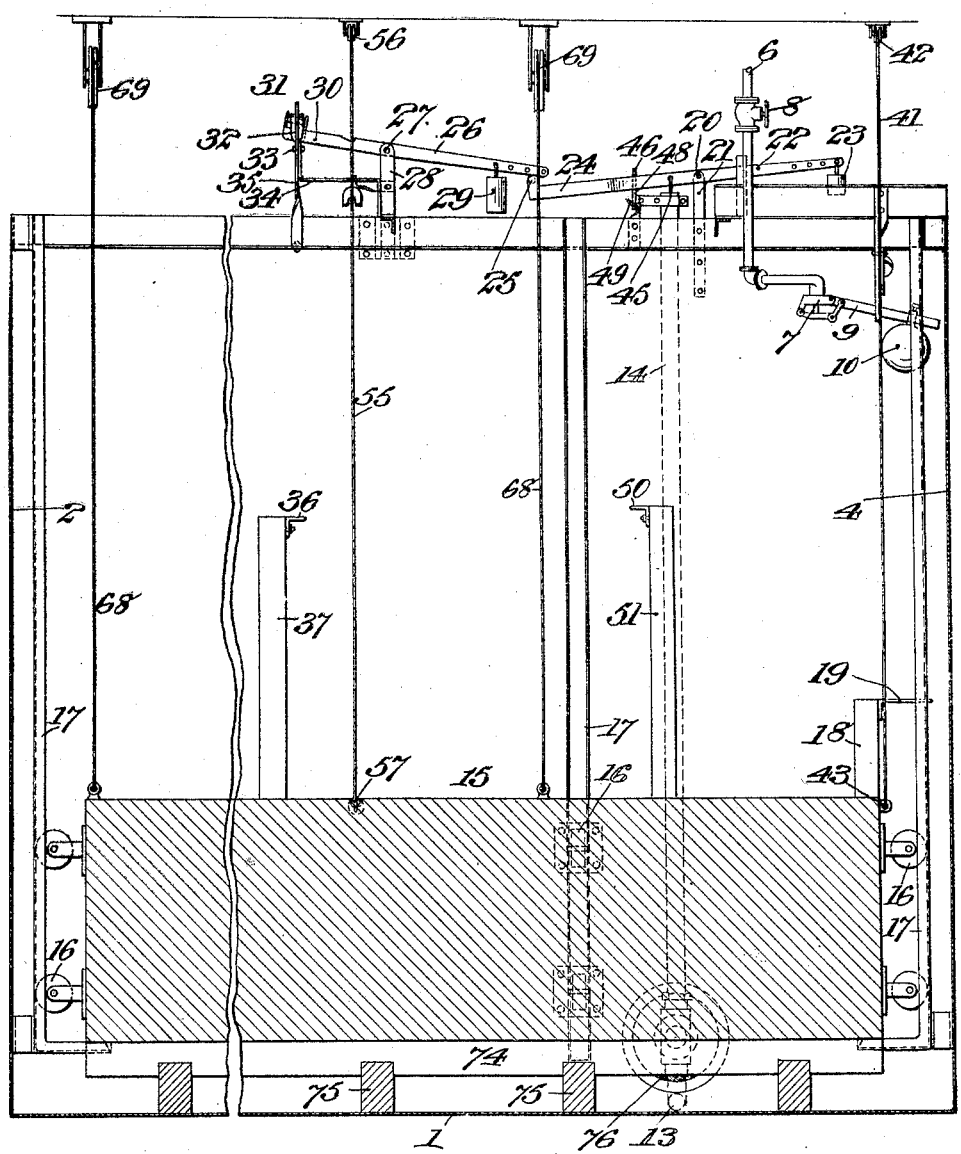

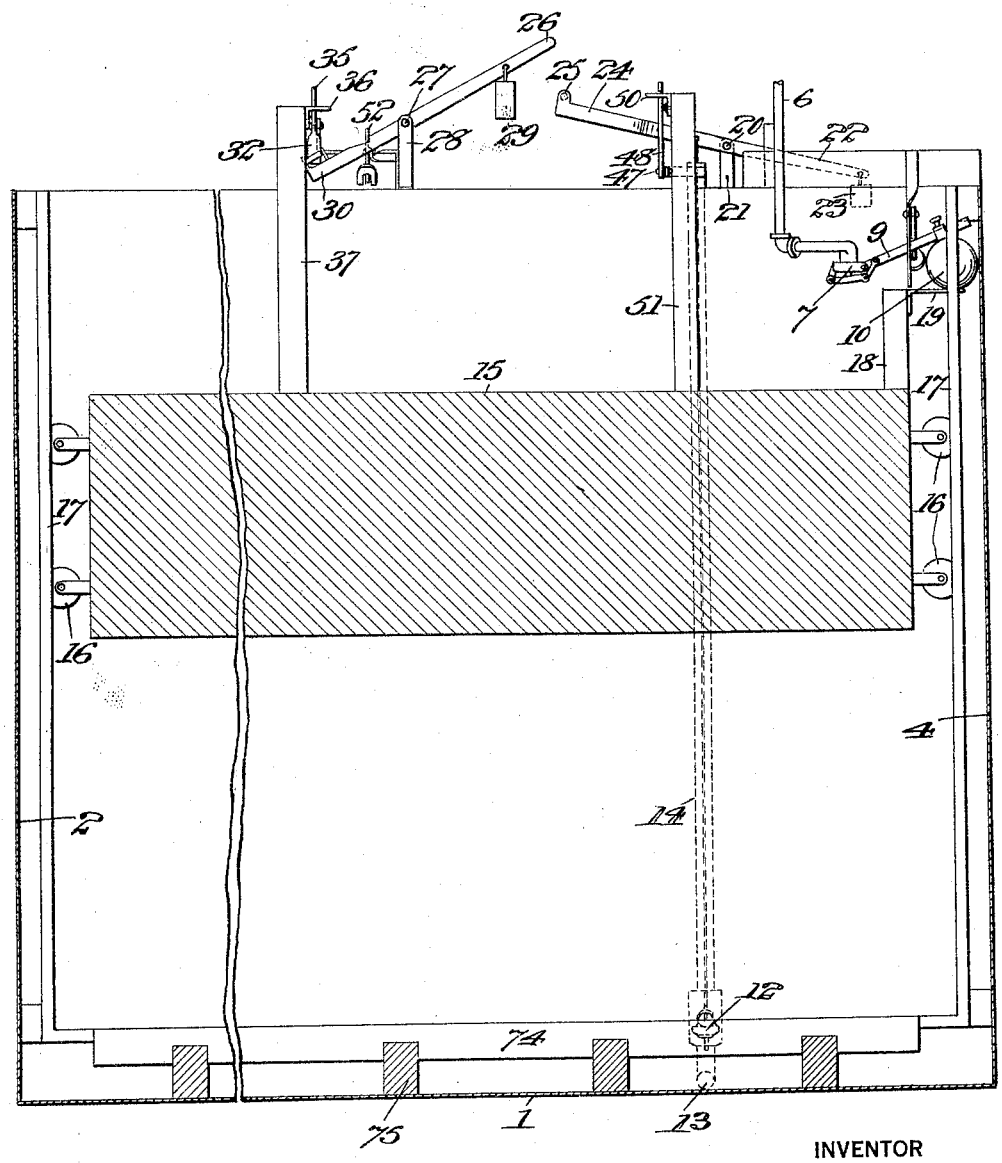

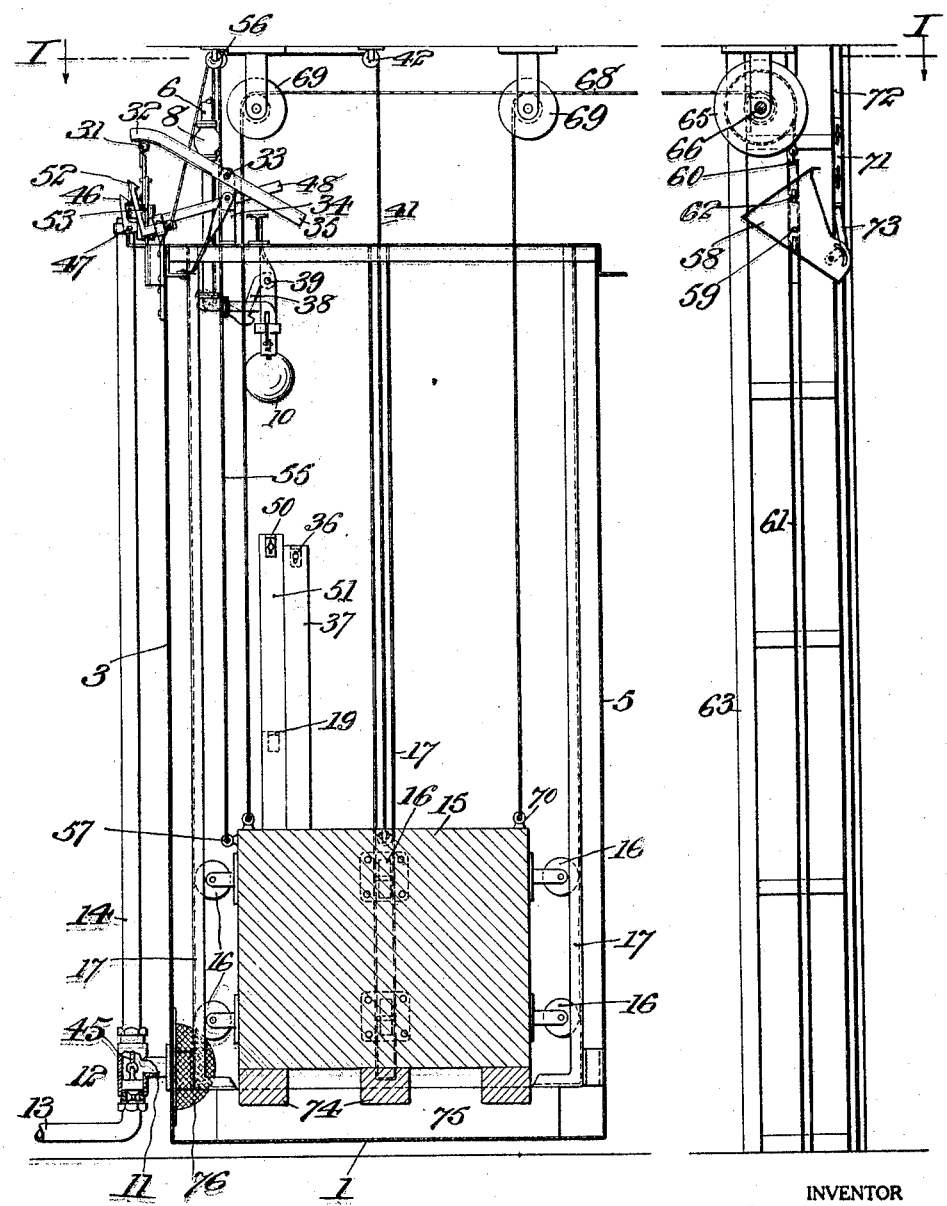

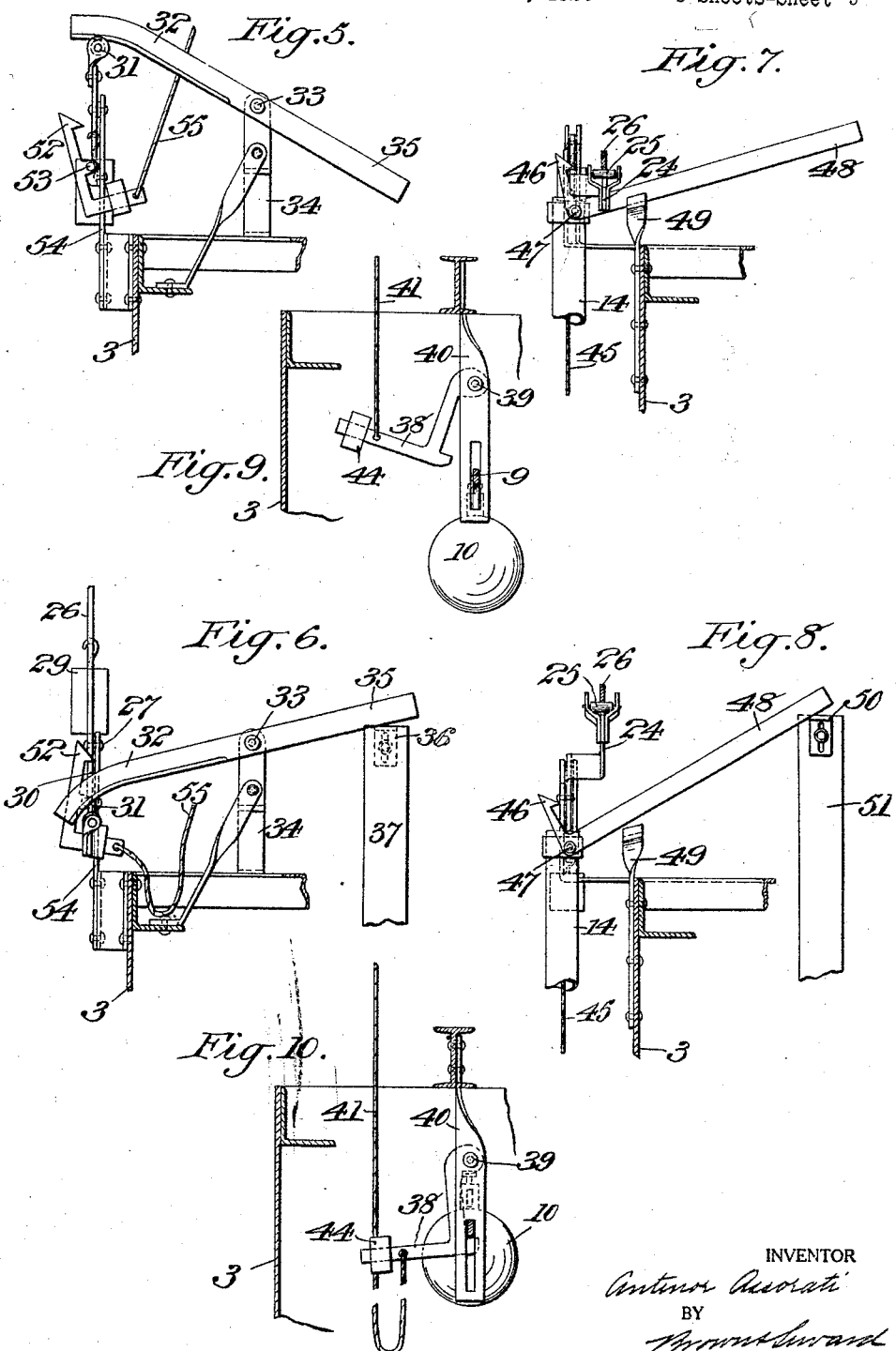

Patented July 21, 1925.

1,546,911

UNITED STATES PATENT OFFICE.

ANTENOR ASSORATI, OF LYNBROOK, NEW YORK, ASSIGNOR OF ONE-HALF TO HENRI CHARPENTIER, OF LYNBROOK, NEW YORK.

POWER APPARATUS.

Application filed November 29, 1924. Serial No. 752,952.

*To all whom it may concern:*

Be it known that I, ANTENOR ASSORATI, a subject of the King of Italy, and resident of Lynbrook, in the county of Nassau, and State of New York, have invented a new and useful Improvement in Power Apparatus, of which the following is a specification.

The object of my invention broadly is to utilize the power obtained by the rise and fall of a liquid to different levels (such for instance as the rise and fall of the tide or the rise and fall of water in a tank) by the use of a power float or floats, to raise any material (as, for instance, water, grain, building materials, metal, etc. etc.) from a lower level to a higher level and discharge the same.

The object of my invention more specifically is to utilize a float located in a tank which is automatically filled and emptied by the rise and fall of the float to predetermined levels, which float is connected to material elevating mechanism having one or more material elevating devices so that as the float rises with the rise of the liquid in the tank, the material elevating device or devices will be lowered and as the float falls with the fall of said liquid, the material elevating device or devices will be raised to a predetermined point or points and the material there discharged or released; the connection between the float and the material elevating mechanism being such that a predetermined vertical movement of the float will impart a considerably greater vertical movement to the material elevating device or devices.

The object of my invention still more specifically is to provide a novel power transmitting connection between the float and the material elevating mechanism and also a novel system of levers operated by the float for closing the liquid inlet and opening the liquid outlet when the liquid has raised the float to a predetermined level and for closing the liquid outlet and opening the liquid inlet when the float has dropped to a predetermined level.

A practical embodiment of my invention is represented in the accompanying drawings which illustrates my power apparatus in connection with a tank having a valved liquid inlet near its top and a valved liquid outlet near its bottom, said power apparatus being employed to operate a series of material elevating devices.

Fig. 2 represents a section taken in the plane of the line II—II of Fig. 1, the float being shown at the limit of its movement with the liquid outlet for the tank closed and liquid inlet opened.

Fig. 3 represents a detail section taken in the same plane, the float being shown at the limit of its upward movement with the liquid outlet opened and the liquid inlet closed.

Fig. 4 represents a section taken in the plane of the line IV—IV of Fig. 1.

Figs. 5 and 6 represent detail sections taken in the plane of the line V—VI of Fig. 1, the latch for the intermediate lever being shown released in Fig. 5 and engaged in Fig. 6.

Figs. 7 and 8 represent enlarged sections taken in the plane of the line VII—VIII of Fig. 1, the latch for the outlet valve lever being shown engaged in Fig. 7 and released in Fig. 8.

Figs. 9 and 10 represent enlarged detail sections taken in the plane of the line IX—X of Fig. 1, the latch for the inlet valve lever being shown released in Fig. 9 and engaged in Fig. 10.

Figure 1:
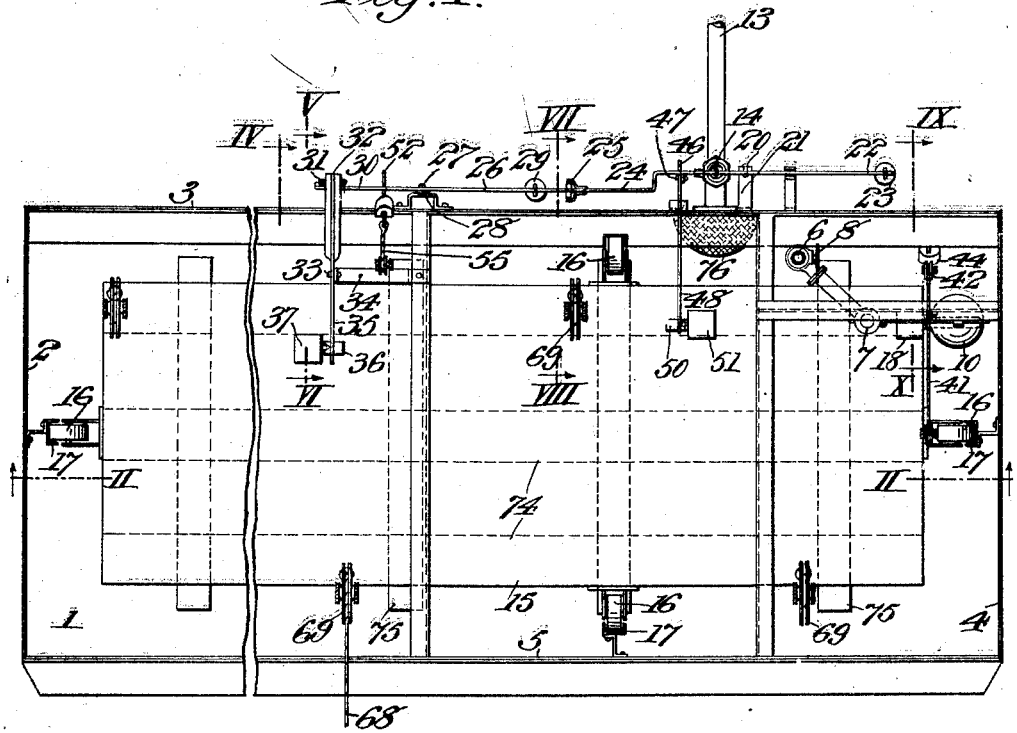
Fig. 1 represents the power apparatus partly in top plan and partly in section, taken in the plane of the line I—I of Fig. 4.
Figure 1:
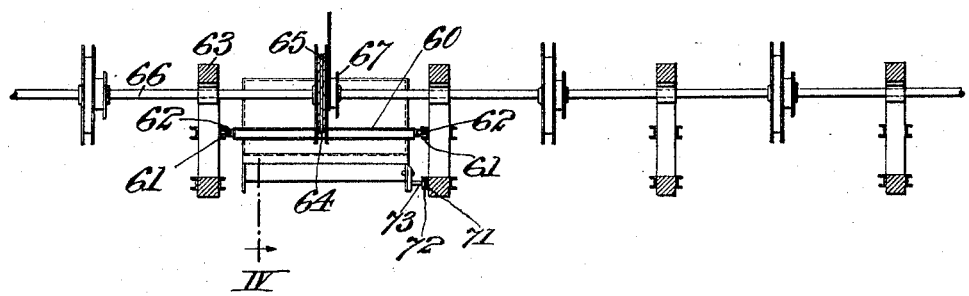

The tank herein illustrated is of rectangular form, the bottom being denoted by 1 and the four uprising side walls by 2, 3, 4, 5. A valved liquid inlet for the tank is provided near the top of the tank through a supply line 6, the double float operated valve for opening and closing the inlet being denoted by 7 and the manual valve for opening and closing the outlet being denoted by 8. The inlet valve 7 is opened and closed by the fall and rise, respectively, of a lever 9 provided with an adjustable float 10.

A valved liquid outlet 11 is provided near the bottom of the tank, the valve 12 for opening and closing the outlet being located in the pipe line 13, which pipe line is provided with a vertical extension 14 located along the exterior of the tank.

The power float 15 of considerable weight is located within the tank, which power float may be guided in its upward and downward movements by the wheels 16 traveling in vertical tracks 17 along the side walls of the tank. These guide wheels will ensure the even upward and downward movement of the float with the rise and fall of the liquid in the tank and will maintain the float in its horizontal position.

The power float operated means for closing the inlet and opening the outlet when the float reaches the limit of its upward movement and for closing the outlet and opening the inlet when the power float reaches the limit of its downward movement are constructed, arranged and operated as follows:

The power float 15 is provided with an upright 18 having an adjustable abutment 19 arranged in position to engage the float 10 of the inlet valve lever 9 and lift the lever to close the inlet valve 7 as the power float reaches the limit of its upward movement. If, for any reason, the float should become stuck in its upward movement, the filling of the tank to a predetermined level will cause the liquid itself to lift the float 10 and thereby the lever 9 to close the inlet valve, thus preventing the tank from overflowing.

An outlet valve lever is pivoted at 20 to a bracket 21, one arm 22 of which lever is provided with an adjustable weight 23 and the other arm 24 of which lever is provided with a stud or roller 25 in position to be engaged by the free end of a weighted arm 26 of an intermediate lever pivoted at 27 to a bracket 28. The arm 26 of the intermediate lever is provided with an adjustable weight 29, and the other arm 30 is provided with a stud or roller 31, arranged to be engaged by one arm 32 of the float operated lever pivoted at 33 to a bracket 34, the other arm 35 of which float operated lever being arranged in position to be engaged by the adjustable abutment 36, carried by the upright 37 of the power float 15. A power float operated latch 38 is pivoted at 39 to a bracket 40 in which the inlet valve lever 9 works, which latch is connected to the power float by a flexible connection 41, leading from the said latch 38 upwardly around a pulley 42 and thence downwardly to the power float at the point 43. This latch 38 is provided with a weight 44 for swinging the latch into engagement with the inlet valve lever after it has been raised to close the valve, to hold the lever raised and the inlet valve closed during the downward movement of the power float until the latch is released through the flexible connection 41 when the power float reaches the limit of its downward movement.

The arm 24 of the outlet valve lever is connected to the outlet valve through the flexible connection 45, which leads downwardly through the pipe extension 14. A latch 46 is pivoted at 47 on the top of the pipe extension 14, which latch is provided with a weighted arm 48 normally resting on a support 49. This arm 48 is located in position to be engaged by an adjustable abutment 50, carried by an upright 51 of the power tank 15. When the arm 24 of the outlet valve lever is depressed to hold the outlet valve closed, the weighted latch 46 will engage and hold the lever in this position until the power float rises to near the limit of its upward movement when the further upward movement of the power float will release the latch so that when the locking lever permits the outlet valve lever to operate, it will open the outlet valve.

This locking lever which controls the movement of the outlet valve lever is controlled as follows:

A weighted latch 52 is pivoted at 53 to a bracket 54, the weighted arm of which lever is connected to the power float by a flexible connection 55 leading from the latch upwardly and over a pulley 56 and thence downwardly into engagement with the float at 57. When no strain is exerted on the flexible connection 55, the latch 52 will normally swing into engagement with the arm 30 of the intermediate lever when the said arm is depressed, as shown in Fig. 3, for temporarily holding the intermediate lever in this position. This arm 30 of the intermediate lever is depressed by the float operated lever as the float approaches the limit of its upward movement. As the float reaches the limit of its downward movement it will exert a strain on the flexible connection 55 to release the latch 52 from its engagement with the arm 30 of the intermediate lever, thus permitting the intermediate lever to swing the float operated lever back to the position shown in Fig. 5 and to have the weighted arm 26 of the intermediate lever engage and depress the arm 24 of the outlet valve lever.

I will now proceed to describe the elevating mechanism which I have shown in connection with my power apparatus:—

A series of material elevating devices, such as buckets 58 are provided, each bucket being pivoted at 59 in a frame 60, provided with guide rollers 61, running in vertical tracks 62, secured to the spaced uprights 63. Each frame 60 is connected by a flexible connection 64 to a winding drum 65, carried by a cross shaft 66 mounted in suitable bearings in the uprights 63. A smaller winding drum 67 is connected to the power float 15 by a flexible connection 68 which passes over a pulley 69 into engagement with the power float at 70.

Therefore, the upward and downward movements of the power float 15 will cause downward and upward movements of the bucket 58, the movements of the bucket being greater than the movements of the power float in proportion to the relative diameters of the drums 65, 67.

The bucket 58 may be tilted to discharge its contents at any predetermined point by means of an adjustable abutment 71 in a vertical track 72 in which an arm 73 carried by the bucket, travels.

Means are provided for supporting the power float 15 a short distance above the bottom 1 of the tank, which means in the present instance comprises a framework composed of longitudinal and crossbars 74, 75. The liquid outlet at the bottom of the tank is preferably provided with a screen 76. The means for controlling the inlet and outlet of the liquid, shown and described but not claimed herein will form the subject matter of a divisional application about to be filed by me.

It is evident that I can utilize a plurality of tanks if so desired, the tanks being located at different levels so that the liquid escaping from one tank can be caused to flow into the next lower tank, etc.

It is also evident that various changes may be resorted to in the construction, form and arrangement of the several parts without departing from the spirit and scope of my invention; hence, I do not intend to be limited to the particular embodiment herein shown and described, but—

What I claim is:—

1. In a power apparatus, a power float raised and lowered by the rise and fall of a liquid, and a material elevating and discharging mechanism connected to and operated by the float.

2. In a power apparatus, a power float of considerable weight raised and lowered by the rise and fall of a liquid, and a material elevating and discharging mechanism connected to and operated by the float, the connection between the float and the elevating and discharging mechanism being such that the material is raised by the weight of the float in its downward movement.

3. In a power apparatus, a power float raised and lowered by the rise and fall of a liquid, and a material elevating and discharging mechanism connected to and operated by the float, said mechanism including one or more material elevating and discharging devices raised and lowered by the fall and rise respectively, of the float.

4. In a power apparatus, a power float raised and lowered by the rise and fall of a liquid, a material elevating and discharging mechanism connected to and operated by the float, said mechanism including one or more material elevating devices raised and lowered by the fall and rise respectively, of the float, and means for causing the discharge of the material when it reaches a predetermined point in its upward movement.

5. In a power apparatus, a power float raised and lowered by the rise and fall of a liquid, and a material elevating and discharging mechanism connected to and operated by the float, said mechanism including one or more material elevating devices raised and lowered by the fall and rise respectively, of the float, a predetermined movement of the float imparting a greater predetermined movement to the material elevating device or devices.

6. In a power apparatus, a power float raised and lowered by the rise and fall of a liquid, a material elevating and discharging mechanism connected to and operated by the float, said mechanism including one or more material elevating devices raised and lowered by the fall and rise respectively, of the float, a predetermined movement of the float imparting a greater predetermined movement to the material elevating device or devices, and means for causing the discharge of the material when it reaches a predetermined point in its upward movement.

7. In a power apparatus, a power float raised and lowered by the rise and fall of a liquid, and a material elevating and discharging mechanism including an elevating device and an operative connection between the float and elevating device, comprising a shaft having a larger and a smaller winding drum, a flexible connection between the float and smaller drum, and a flexible connection between the larger drum and elevating device.

8. In a power apparatus, a power float raised and lowered by the rise and fall of a liquid, and a material elevating and discharging mechanism including an elevating device and an operative connection between the float and elevating device, comprising a shaft having a larger and a smaller winding drum, a flexible connection between the float and smaller drum, a flexible connection between the larger drum and elevating device, and means for causing the discharge of the material when the device reaches a predetermined point in its upward movement.

9. In a power apparatus, a power float raised and lowered by the rise and fall of a liquid, a material elevating and discharging mechanism including a plurality of elevating devices and operative connections between the float and elevating devices, comprising a shaft having a larger and a smaller winding drum for each elevating device, a flexible connection between the float and each smaller drum, and a flexible connection between each larger drum and its elevating device.

10. In a power apparatus, a power float raised and lowered by the rise and fall of a liquid, a material elevating and discharging mechanism including a plurality of elevating devices and operative connections between the float and elevating devices, comprising a shaft having a larger and a smaller winding drum for each elevating device, a flexible connection between the float and each smaller drum, a flexible connection between each larger drum and its elevating device, and means for causing the discharge of the material when the devices reach a predetermined point in their upward movements.

In testimony that I claim the foregoing as my invention, I have signed my name this 28th day of November 1924.

ANTENOR ASSORATI